United States Patent [19]

Hunter

[11] Patent Number: 4,822,064
[45] Date of Patent: Apr. 18, 1989

[54] COMBINATION CHILD VEHICLE SEAT AND STROLLER

[76] Inventor: Everett E. Hunter, Rt. 1, Box 21, Pomona, Kans. 66076

[21] Appl. No.: 147,509

[22] Filed: Jan. 25, 1988

[51] Int. Cl.$^4$ .............................................. B62B 7/12
[52] U.S. Cl. ...................................... 280/30; 280/643; 280/648
[58] Field of Search ................. 280/30, 642, 643, 647, 280/648, 47.38, 9; 297/250, 254

[56] References Cited

U.S. PATENT DOCUMENTS 4,647,054 3/1987 Chong .................................... 280/30
4,679,804 7/1987 Johnson ................................ 280/30
4,685,688 8/1987 Edwards ............................. 280/643

FOREIGN PATENT DOCUMENTS 2274490 1/1976 France ................................ 280/643

Primary Examiner—Charles A. Marmor
Assistant Examiner—Richard Camby
Attorney, Agent, or Firm—Kokjer, Kircher, Bradley, Wharton, Bowman & Johnson

[57] ABSTRACT

A device that converts for use as both a child car seat and a stroller. A molded plastic seat is mounted on a tubular frame to receive a child. Front and rear wheel assemblies extend when the device is used as a stroller and retract when the device is used as a car seat. A handle extends for use as a stroller and retracts when in the car seat mode of use. The components can be locked in the extended position. The extension and retraction of the wheels and handle are effected pivotally and telescopically in different embodiments of the invention.

10 Claims, 2 Drawing Sheets

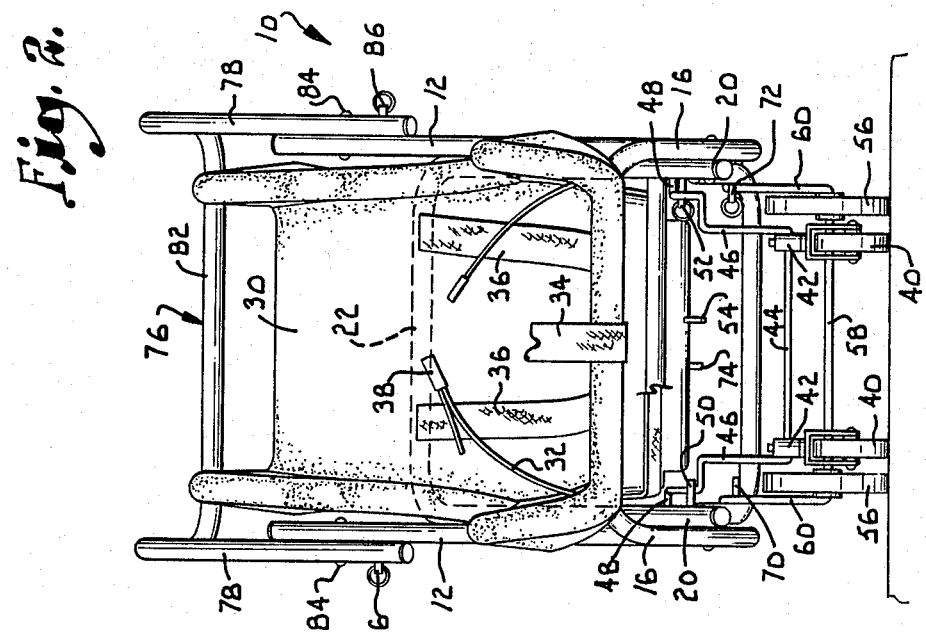
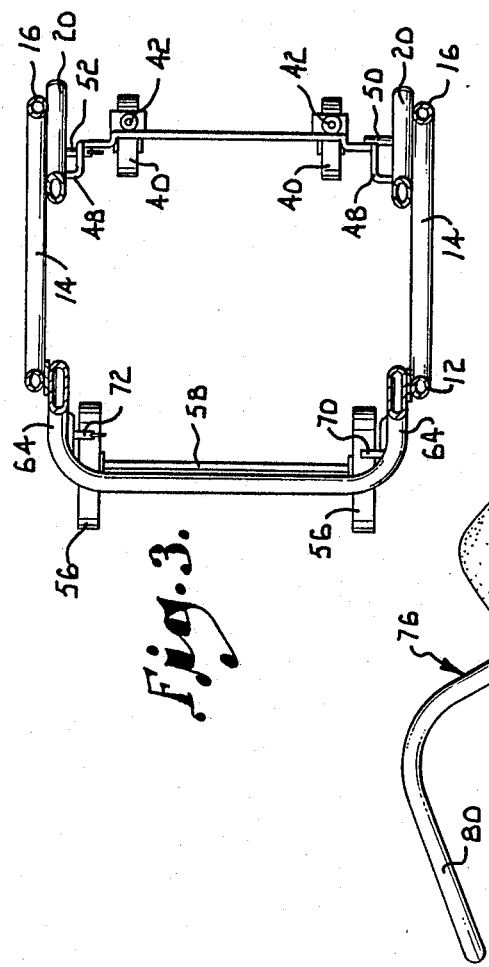
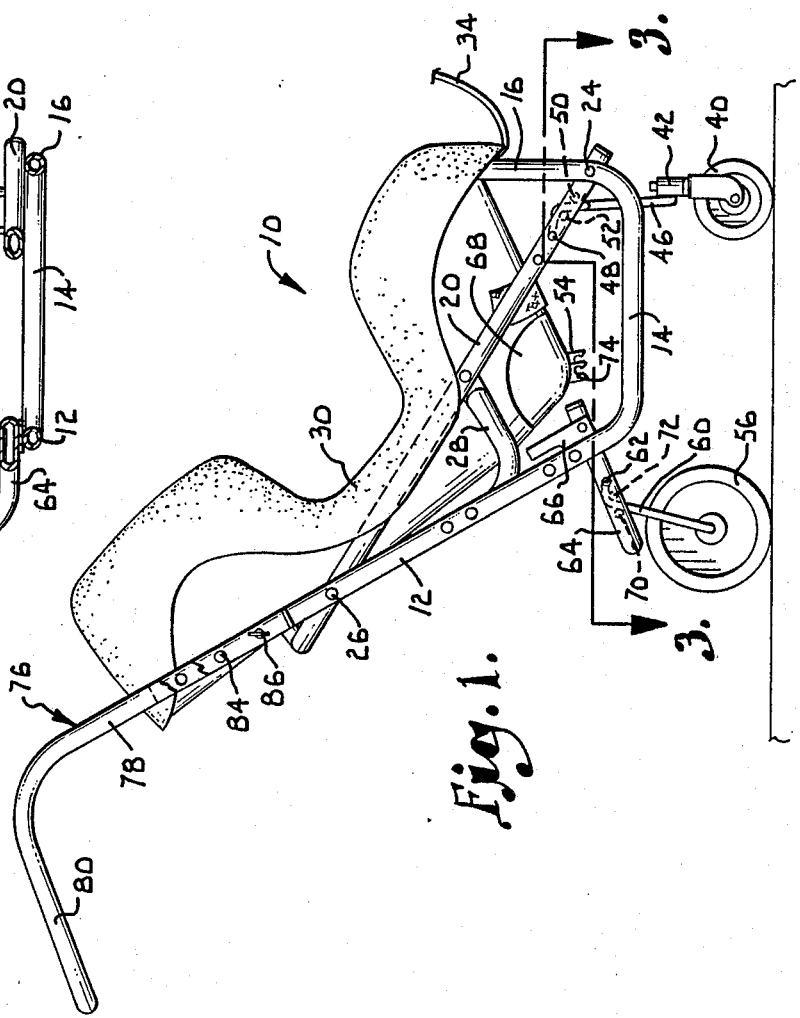

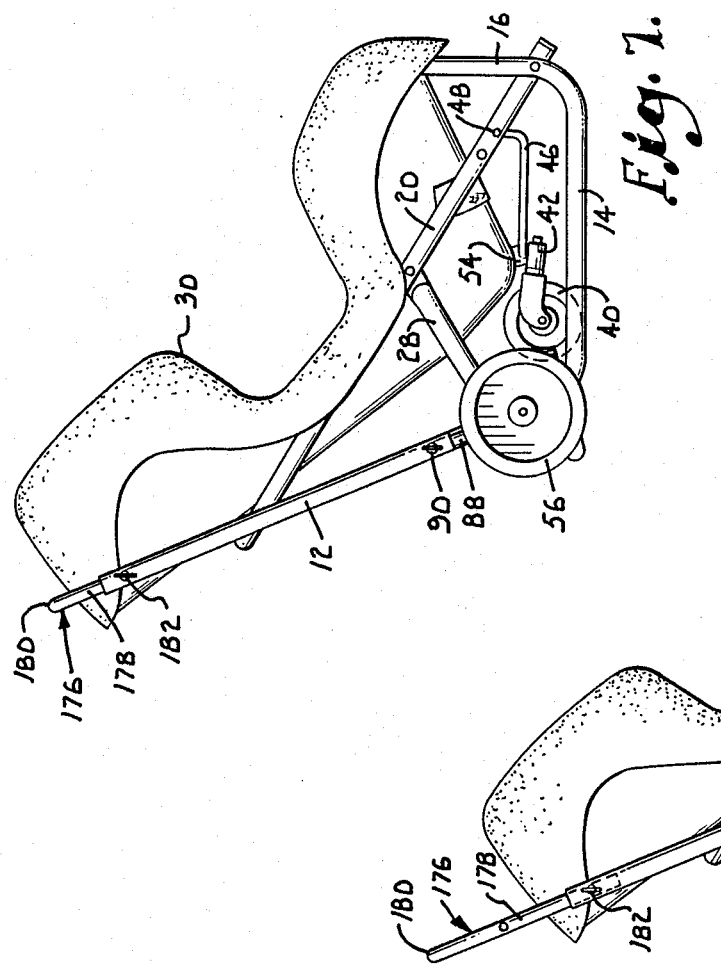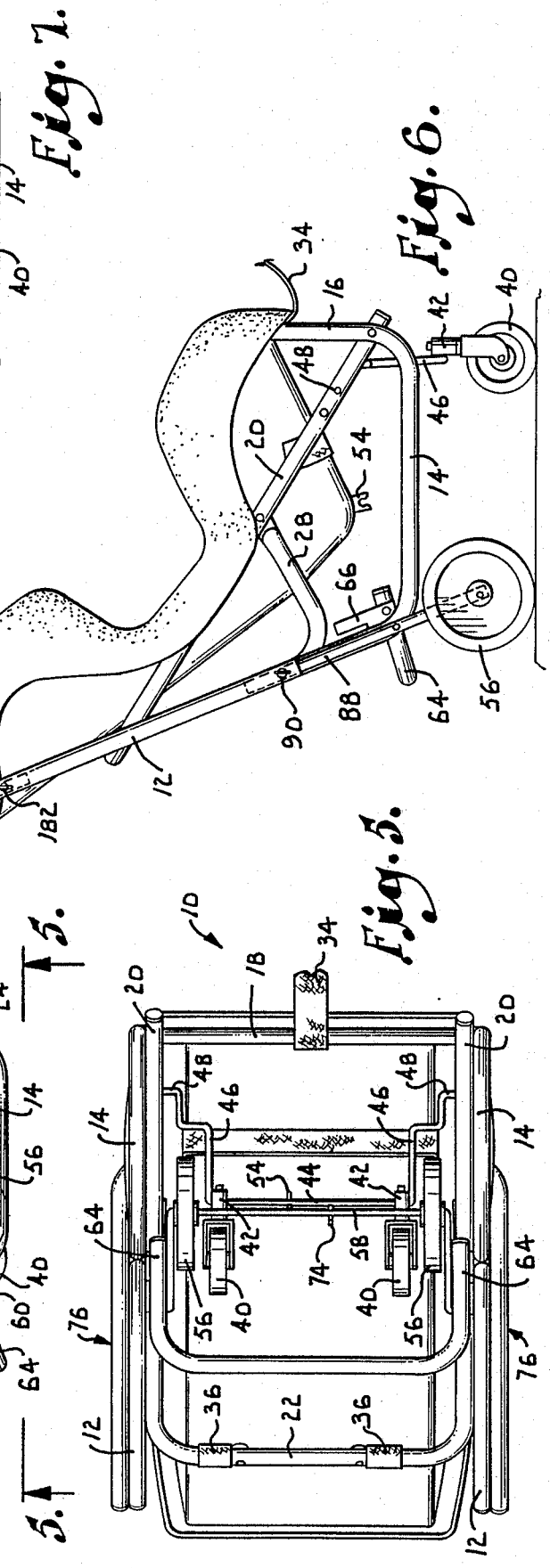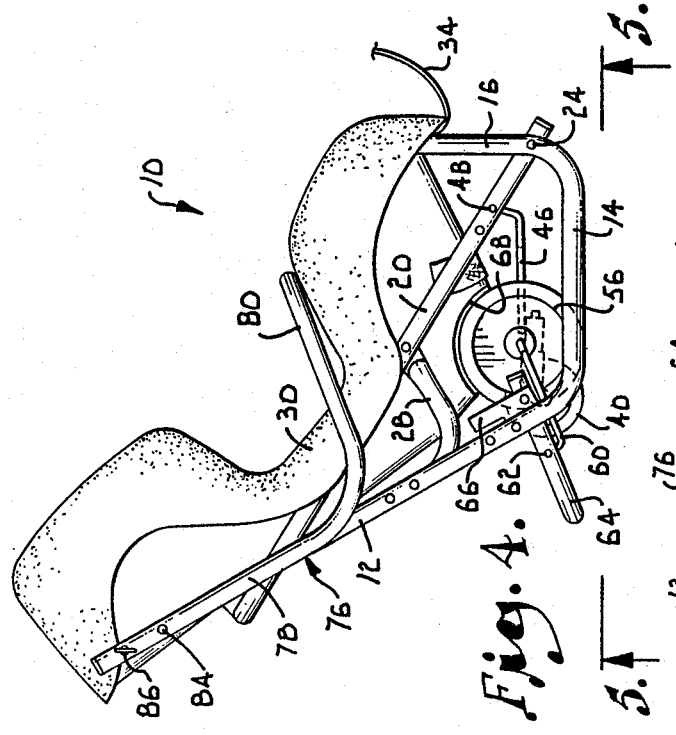

COMBINATION CHILD VEHICLE SEAT AND STROLLER

BACKGROUND AND SUMMARY OF THE INVENTION

This invention relates to a device that functions alternatively as a child vehicle seat and as a stroller.

It is the principal goal of the invention to provide a single unit that converts easily from a car seat to a stroller and from a stroller to a car seat. This eliminates the need for parents to purchase both a car seat and a stroller.

In accordance with the invention, a molded plastic seat is mounted on a rigid frame formed by metal tubing. Front and rear wheels are provided for use when the device functions as a stroller. The wheels can be locked in an extended position during service as a stroller and can be retracted when the device is to serve as a car seat. A handle likewise extends or retracts depending upon which mode of use the device is to be put.

In one form of the invention, both the front and rear wheels move pivotally between the extended and retracted positions, and the handle is likewise pivotally mounted. Releaseable locking pins can be applied to lock the wheels in their extended position in a unique manner. Both sets of wheels are retained in the retracted position by catches. In this embodiment, the handle may be locked in the retracted position and then serves as a safety bar extending across the front of a child seated in the car seat.

In another embodiment of the invention, the handle and the rear wheels are mounted for telescopic extension and retraction. Locking pins may be applied to lock the handle and the rear wheels in whichever position is desired. The front wheels pivot between the extended and retracted positions.

DESCRIPTION OF THE DRAWINGS

In the accompanying drawings which form a part of the specification and are to be read in conjunction therewith and in which like reference numerals are used to indicate like parts in the various views:

FIG. 1 is a side elevational view of a combination child vehicle seat and stroller constructed according to one embodiment of the present invention, with the wheels and handle locked in their extended positions for service as a stroller;

FIG. 2 is a front elevational view of the unit shown in FIG. 1;

FIG. 3 is a fragmentary sectional view taken generally along line 3—3 of FIG. 1 in the direction of the arrows;

FIG. 4 is a side elevational view similar to FIG. 1, but showing the wheels and handle pivoted to their retracted positions for service as a car seat;

FIG. 5 is a bottom plan view taken generally along line 5—5 of FIG. 4 in the direction of the arrows;

FIG. 6 is a side elevational view of a combination child vehicle seat and stroller constructed according to a second embodiment of the invention, with the wheels and handle locked in their extended positions for service as a stroller; and FIG. 7 is a side elevational view similar to FIG. 6, but showing the wheels and handle in their retracted positions for service as a car seat.

DETAILED DESCRIPTION OF THE INVENTION

Referring now to the drawings in more detail and initially to FIGS. 1-5, reference numeral 10 generally designates a device which functions alternatively as a child vehicle seat and a stroller. The vehicle seat-stroller 10 has a rigid frame constructed of tubular metal. The frame includes a pair of inclined parallel tubes 12 which are located on opposite sides of the device and which are integral at their lower ends with parallel horizontal tubes 14. The tubes 14 form a base portion of the frame which can rest on a vehicle passenger seat when the unit functions as a child vehicle seat. At their forward ends, tubes 14 are integral with upturned tubes 16, and another horizontal tube 18 extends between the two tubes 16 at their top ends. Tubes 12, 14, 16 and 18 are formed as a single integral piece.

The frame also includes a U-shaped brace which has inclined parallel legs 20 on its opposite sides and a horizontal cross bar 22 extending between the upper ends of legs 20. Legs 20 are secured at 24 to the lower end portions of tubes 16 and at 26 to the upper end portions of tubes 12. A pair of curved arms 28 are secured to the mid portions of the respective legs 20 at one end and to mid portions of tubes 12 at the other end.

This construction provides a rigid and yet lightweight frame which supports a molded plastic seat 30 having a size and shape to accommodate a child. The lower end of seat 30 rests on and is secured to the crossbar 18. The back of the seat 30 engages and is secured to crossbar 22. The seat 30 is equipped with a lap belt 32 and a between the legs strap 34 which is looped around crossbar 18. A shoulder harness includes a pair of straps 36 which are looped around crossbar 22. The belts and straps of the safety harness may be secured together by a buckle 38.

In accordance with the present invention, a pair of front wheels 40 are caster type wheels which are mounted to swivel on spindles 42. As best shown in FIG. 2, a bracket on which the spindles 42 are mounted includes a horizontal rod 44 which extends between the two spindles 42, leg portions 46 which extend upwardly from the opposite ends of rod 44, and opposite end portions which are bent in compound fashion and terminate in horizontal pins 48. The two pins 48 are axially aligned and are fitted in openings formed in the opposite legs 20 near their lower ends. The pins 48 are able to turn relative to legs 20 and thus provide a horizontal pivot axis about which the bracket and front wheels 40 may be pivoted. The wheels 40 can pivot between the extended position shown in FIG. 1 and the retracted position shown in FIG. 4. In the extended position, the wheels 40 extend well below tubes 14 so that the wheels can roll on a sidewalk or other surface when the unit is being used as a stroller. In the retracted position, wheels 40 are retracted beneath the seat 30 and above tubes 14 so that the tubes 14 can rest on a vehicle passenger seat when the unit is being used as a child car seat.

As best shown in FIG. 2, one of the legs 20 has a fixed pin 50 projecting inwardly from it at a position to engage the front wheel bracket such that it prevents the bracket from pivoting forwardly beyond the extended position of the front wheel assembly shown in FIG. 1. A removable pin 52 may be applied to lock the front wheel assembly in the extended position. Pin 52 may be fitted in an opening formed in the leg 20 opposite the leg which carries pin 50, and this opening is located such that pin 52 fits closely behind the end portion of the front wheel bracket. Consequently, when pin 52 is in place, it engages the front wheel bracket in order to prevent it from pivoting away from the extended position. Pin 52 may be removed, and the front wheel bracket can then be swung rearwardly to the retracted position.

When the front wheel bracket is swung to the retracted position, rod 44 is received in and retained by a releaseable catch 54 which projects from the bottom of the seat 30. The catch 54 thus retains the front wheel bracket in the retracted position. The front wheel bracket can be removed from catch 54 upon exertion of sufficient force.

A pair of rear wheels 56 are somewhat larger than the front wheels 40 and are mounted for rotation on a horizontal axle 58. The axle 58 forms part of a rear wheel bracket which includes a pair of legs 60 and a pair of axially aligned pins 62 which are turned outwardly from the top ends of legs 60. The pins 62 are fitted in openings formed in the opposite legs 64 of a U-shaped bracket which is connected with legs 12 by brackets 66. The pins 62 thus provide a horizontal pivot axis about which the rear wheel bracket may be pivoted to carry the rear wheels 56 between the extended position shown in FIG. 1 and the retracted position shown in FIG. 4. In the extended position, wheels 56 project well below tubes 14 so that the wheels can roll along a sidewalk or other surface. In the retracted position, the rear wheels 56 are retracted beneath seat 30 and above tubes 14 so that the tubes may rest on an automobile seat when the unit is used as a child car seat. The opposite sides of seat 30 are provided with recesses 68 which form wheel wells in which the rear wheels 56 are received in the retracted position.

A fixed pin 70 projects inwardly from one of the legs 64 and engages leg 60 in order to prevent the rear wheel bracket from swinging rearwardly beyond the extended position. A removable pin 72 may be fitted in an opening in the other leg 64 and is then located to engage the front of the opposite bracket leg 60. When pin 72 is in place, it prevents the rear wheel bracket from being pivoted away from the extended position, and the rear wheel assembly is then locked in place in the extended position.

In the retracted position of the rear wheel assembly, the axle 58 is received in and retained by a catch 74 which extends from the bottom of seat 30. The catch 74 thus retains the rear wheel bracket in the retracted position and yet allows it to be released upon the exertion of sufficient force.

Numeral 76 generally designates a handle which includes a pair of parallel legs 78 on its opposite sides, a pair of arms 80 turned rearwardly from the upper ends of the legs 78, and a crossbar 82 which extends between the back ends of the arms 80. The handle 76 is preferably formed in a single piece of metal tubing. The two legs 78 are pivotally pinned at 84 to the respective tubes 12 near their upper ends. The two pivot pins 84 are aligned and provide a horizontal axis about which handle 76 can be pivoted between the extended position shown in FIG. 1 and the retracted position shown in FIG. 4. In the extended position, legs 78 essentially form upward extensions of legs 12 and the cross bar 82 is located well above the seat 30 at a convenient position to serve as a hand hold for pushing or pulling the unit when it is being used as a stroller. In the retracted position, the crossbar 82 extends across the front of a child seated in the seat 30, and the crossbar 82 then serves as a safety bar for a child seated in the seat 30 when it is being used as a child vehicle seat.

A pair of removable locking pins 86 are provided to permit the handle to be locked in its extended and retracted positions. In the extended position of the handle, pins 86 may be inserted through aligned openings in the handle and tubes 12 located below the pivot pins 84, and this locks the handle in place and prevents it from being pivoted away from the extended position. In the retracted position of the handle, pins 86 may be extended through openings in the handle and tubes 12 located above the pivot pins 84, thus preventing the handle from being pivoted away from its retracted position.

In use of the device as a stroller, the front wheels 40, rear wheels 56 and handle 76 are all locked in their extended positions as shown in FIGS. 1 and 2. A child may be seated in the seat 30 and strapped in by the safety harness. The stroller may then be rolled along a sidewalk or other surface on the wheels 40 and 56, and the crossbar 82 provides a convenient hand hold for pushing of the stroller.

When the unit is to be converted for use as a child automobile seat, pins 52 and 72 are removed and the front and rear wheel assemblies are swung upwardly to their retracted positions. The catches 54 and 74 retain the wheel brackets in the retracted positions, and the unit may then be placed on an automobile passenger seat with the base tubes 14 resting on the seat. The seat belt of the passenger seat may be applied to the frame of the unit in order to secure it in place on the automobile seat. Preferably, the seat belt is threaded between tubes 12 and seat 30, although it can be applied to other portions of the frame if desired. After the child has been seated in the seat 30 and strapped in place by the safety harness, pins 86 are removed and the handle 76 is swung downwardly to its retracted position. Pins 86 are then applied to lock the handle in its retracted position, and the crossbar 82 then serves as a safety bar to help hold the child in the car seat.

The device 10 thus serves the dual functions of a child car seat and a stroller. This eliminates the need for parents to purchase both a car seat and a stroller. The unit is constructed such that it can be quickly and easily converted between the car seat and stroller modes of use. The device is also lightweight so that it can be easily moved into and out of a vehicle without difficulty.

FIGS. 6 and 7 depict an alternative embodiment of the invention which is constructed in most respects in the same manner as the embodiment shown in FIGS. 1–5. The only differences between the second embodiment and the first embodiment are that the rear wheel assembly and handle move telescopically between the extended and retracted positions rather than pivotally as in the FIG. 1–5 arrangement. In FIGS. 6 and 7, the same reference numerals are used to identify parts that are the same as the parts used in the FIG. 1–5 arrangement.

In the form of the invention shown in FIGS. 6 and 7, tubes 12 are open at their top and bottom ends and are secured to the remainder of the frame by suitable fasteners. Each rear wheel 56 is mounted for rotation on the lower end of a rigid leg 88 which fits telescopically in the lower end of the corresponding tube 12. The telescopic fit of legs 88 in tubes 12 permits the rear wheels 56 to be moved telescopically between the extended position shown in FIG. 6 and the retracted position shown in FIG. 7. The rear wheels 56 may be locked in the extended position by inserting locking pins 90 through aligned openings formed in tubes 12 and legs 88. Preferably, legs 88 fit rather closely in tubes 12 in order to prevent the rear wheels from having excessive "play" when in the extended position. The rear wheels may also be locked in the retracted position by inserting the pins 90 through tubes 12 and openings in legs 88 which align with them when the rear wheels are in the retracted position. Wheels 56 are located above tubes 14 in the retracted position, although there is no need for the wheel wells 68 because wheels 56 are located somewhat behind the seat 30 in the retracted position.

In the FIGS. 6–7 embodiment of the invention, a generally U-shaped handle 176 is provided. The handle 176 includes parallel opposite legs 178 and a horizontal cross bar 180 which extends between the upper ends of the legs 178. The legs 178 are received telescopically in the upper ends of tubes 12 so that handle 176 may be moved telescopically between the extended position shown in FIG. 6 and the retracted position shown in FIG. 7. In the extended position of the handle 176, the crossbar 180 is located such that it forms a convenient handle for pushing of the unit when it is being used as a stroller. In the retracted position of the handle, the crossbar 180 is retracted slightly below the top of the seat 30 so that it does not project unduly beyond the seat when it is being used as a child car seat. Removable locking pins 182 may be inserted through aligned openings in legs 12 and 178 to lock the handle 176 in either the extended or retracted position.

The front wheels 40 are mounted in the same manner as earlier described in connection with the embodiment of the invention shown in FIGS. 1–5.

It should be noted that the present invention contemplates both pivotal and telescopic extension and retraction of the front and rear wheels and handle. The telescopic arrangement is in some respects simpler than the pivotal arrangement, although it should be noted that the pivotal arrangement provides a somewhat greater wheel base in that the rear wheels 56 may be located farther away from the front wheels, thus providing somewhat more stability in the stroller mode of use.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A combination child vehicle seat and stroller, comprising:
    a rigid frame having a base portion adapted to rest on a vehicle passenger seat;
    a seat on said frame having a size and shape to receive a child therein;
    belt means for retaining the child in said seat;
    a front wheel assembly including a pair of front swivel wheels and bracket means connecting said front wheels with said frame in a manner permitting said front wheels to move between an extended position wherein said front wheels extend below said base portion of the frame and a retracted position wherein said front wheels are located beneath the seat and above said base portion of the frame;
    said bracket means for the front wheel assembly comprising a rigid bracket carrying said front wheels thereon and having opposite end portions and means for mounting said bracket on the frame for pivotal movement to carry the front wheels between the extended and retracted positions thereof;
    releaseable means for locking said front wheels in the extended position;
    said releaseable locking means comprising a fixed stop on the frame engageable with one end portion of said bracket to prevent the bracket from pivoting beyond said extended position of the front wheels and a removable pin applicable to the frame at a location to engage the other end portion of said bracket in a manner preventing the bracket from moving in a direction to carry the wheels from the extended position toward the retracted position, said pin being removable from the frame to release said bracket for movement of the wheels to the retracted position;
    a rear wheel assembly including a pair of rear wheels and bracket means connecting said rear wheels with said frame in a manner permitting said rear wheels to move between an extended position wherein said rear wheels extend below said base portion of the frame behind the front wheels and a retracted position wherein said rear wheels are located beneath the seat and above said base portion of the frame;
    releaseable means for locking said rear wheels in the extended position; and
    a handle connected with said frame in a manner permitting the handle to move between an extended position wherein the handle extends above the frame at a location to serve as a stroller handle and a retracted position wherein the handle extends to a lesser height than in the extended position, whereby said frame and seat can be placed on a vehicle seat for service as a child seat in the retracted positions of the front and rear wheels and handle and can be rolled on said front and rear wheels for service as a stroller in the extended positions of the front and rear wheels and handle.

2. The invention of claim 1, including releaseable catch means for retaining said bracket in the retracted position.

3. The invention of claim 1, wherein said bracket means for the rear wheel assembly comprises:
    an axle on which the rear wheels are mounted for rotation; and
    means for mounting said axle on the frame for pivotal movement about an axis offset from and parallel to the axle to carry the rear wheels between the extended and retracted positions thereof.

4. The invention of claim 3, wherein said releaseable lock means for the rear wheels comprises:
    a fixed stop on the frame engageable with said mounting means to prevent the axle from pivoting beyond the extended position of the rear wheels; and
    a removable pin applicable to the frame at a location to engage said mounting means in a manner preventing the axle from moving in a direction to carry the rear wheels from the extended position toward the retracted position, said pin being removable to release said mounting means for movement of the rear wheels to the retracted position thereof.

5. The invention of claim 1, including means for mounting said handle on the frame for pivotal movement thereof between its extended and retracted positions.

6. The invention of claim 1, wherein said handle includes a cross bar located to serve as a hand hold for the stroller in the extended position and extending across the front of said seat to serve as a safety bar for the child vehicle seat in the retracted position.

7. The invention of claim 6, including releaseable means for locking said handle in the extended and retracted positions.

8. A combination child vehicle seat and stroller, comprising:
   a rigid frame having a base portion adapted to rest on a vehicle seat;
   a seat mounted on said frame having a size and shape to accommodate a child therein;
   a pair of front swivel wheels;
   a front wheel bracket carrying said front wheels thereon and mounted on said frame for pivotal movement between an extended position and a retracted position, said front wheels extending below said base portion of the frame in the extend position and being retracted above said base portion in the retracted position, said front wheel bracket having opposite end portions;
   releaseable means for locking said front wheel bracket in the extended position;
   said releaseable locking means for the front wheel bracket comprising a fixed stop on the frame engageable with one end portion of the front wheel bracket to prevent the front wheel bracket from pivoting beyond the extended position thereof and a removable pin applicable to the frame at a location to engage the other end portion of the front wheel bracket in a manner preventing the front wheel bracket from pivoting from the extended position toward the release position, said pin being removable from the frame to release the front wheel bracket for pivotal movement to the retracted position;
   a pair of rear wheels;
   an axis on which said rear wheels are mounted for rotation;
   means for mounting said axle on the frame for pivotal movement about an axis parallel to said axle between an extended position wherein said rear wheels extend below the base portion of said frame and a retracted position wherein said axle is retracted above said base portion;
   releaseable means for locking said axle in the extended position;
   a handle having a cross bar;
   means for mounting said handle on the frame for pivotal movement between an extended position wherein the handle extends above said frame with the cross bar at a location to serve as a handle for the stroller and a retracted position wherein the cross bar extends across the front of said seat to serve as a safety bar for the child vehicle seat; and
   releaseable means for locking said handle in its extended position and in its retracted position.

9. The invention of claim 8, including releaseable catch means for retaining said front wheel bracket in the retracted position thereof.

10. A combination child vehicle seat and stroller, comprising:
    a rigid frame having a base portion adapted to rest on a vehicle passenger seat;
    a seat on said frame having a size and shape to receive a child therein;
    belt means for retaining the child in said seat;
    a front wheel assembly including a pair of front swivel wheels and bracket means connecting said front wheels with said frame in a manner permitting said front wheels to move between an extended position wherein said front wheels extend below said base portion of the frame and a retracted position wherein said front wheels are located beneath the seat and above said base portion of the frame;
    releaseable means for locking said front wheels in the extended position;
    a rear wheel assembly including a pair of rear wheels and bracket means connecting said rear wheels with said frame in a manner permitting said rear wheels to move between an extended position wherein said rear wheels extend below said base portion of the frame behind the front wheels and a retracted position wherein said rear wheels are located beneath the seat and above said base portion of the frame;
    said bracket means for the rear wheel assembly comprising an axle on which the rear wheels are mounted for rotation and means for mounting said axle on the frame for pivotal movement about an axis offset from and parallel to the axle to carry the rear wheel between the extended and retracted positions thereof;
    releaseable means for locking said rear wheels in the extended position;
    said releaseable locking means for the rear wheels comprising a fixed stop engageable with said mounting means to prevent the axle from pivoting beyond the extended position of the rear wheels and a removable pin applicable to the frame at a location to engage said mounting means in a manner preventing the axle from moving in a direction to carry the rear wheels from the extended position toward the retracted position, said pin being removable to release said mounting means for movement of the rear wheels to the retracted position thereof.

* * * * *